United States Patent
Farr

[11] 3,762,513
[45] Oct. 2, 1973

[54] AUTOMATIC ADJUSTERS
[75] Inventor: Roderick Peter Farr, Chipping Campden, England
[73] Assignee: Girling Limited, Birmingham, England
[22] Filed: Aug. 31, 1971
[21] Appl. No.: 176,498

[30] Foreign Application Priority Data
Sept. 2, 1970 Great Britain............ 41,888/70

[52] U.S. Cl. ......... 188/196 D, 188/72.6, 188/106 F
[51] Int. Cl. ............................................ F16d 65/56
[58] Field of Search ................. 188/72.6, 106 F, 188/196 D, 196 BA

[56] References Cited
UNITED STATES PATENTS
3,338,355  8/1967  Kyllonen .................. 188/196 D FOREIGN PATENTS OR APPLICATIONS
725,181  9/1942  Germany .................. 188/196 D

*Primary Examiner*—Duane A. Reger
*Attorney*—Scrivener, Parker, Scrivener & Clarke

[57] ABSTRACT

An automatic adjuster for a vehicle brake mechanism comprises a force transmitting mechanism having two members with a non-reversible screw-thread connection therebetween. To effect automatic adjustment responsively to excess brake travel, a spring acts axially upon balls rolling along the screw-thread on one of the members or on a separate thread of the same pitch on that member and causes the ball to roll along the thread. The balls are located in a recess in the other member so that as it is urged along the thread it rotates the other member to effect the necessary adjustment. The balls, therefore, effectively provide a reversible screw-thread connection between the two members for the purpose of effecting adjustment.

18 Claims, 4 Drawing Figures

AUTOMATIC ADJUSTERS

The present invention relates to a force transmitting mechanism automatically adjustable in length and comprising two members capable of transmitting a force in one direction but self-adjusting relative to one another in the other direction and is particularly, although by no means exclusively, applicable to automatic adjusters for vehicle brake systems.

According to the present invention, an automatically adjustable force transmitting mechanism comprises two relatively rotatable members in screw-threaded interengagement with one another by means of a non-reversible screw-thread connection, rolling elements circumferentially located with respect to one of said members and rolling in the or another screw-thread in the other of said members and means for applying an axially directed force to said rolling elements responsively to a requirement for adjustment to thereby cause said rolling elements to roll along said screw-thread on said other member and thereby cause said one member to rotate on said other member.

A non-reversible screw-thread connection is one in which the pitch and flank angles of the thread and the coefficient of friction between the mating surfaces of the thread are such that an axially applied force between the members cannot cause relative rotation therebetween. Thus said screw-thread connection is capable of sustaining an axial thrust applied between said members. The rolling elements in effect provide a reversible screw-thread connection between said members operative to cause automatic adjustment when required. In other words the rolling elements render the screw-thread connection reversible in one direction whilst it remains non-reversible in the other direction.

The axial force applied to the rolling elements may be obtained by means of a spring acting through a thrust bearing.

The invention is further described by way of example with reference to the accompanying drawings, in which.

Figure 1:
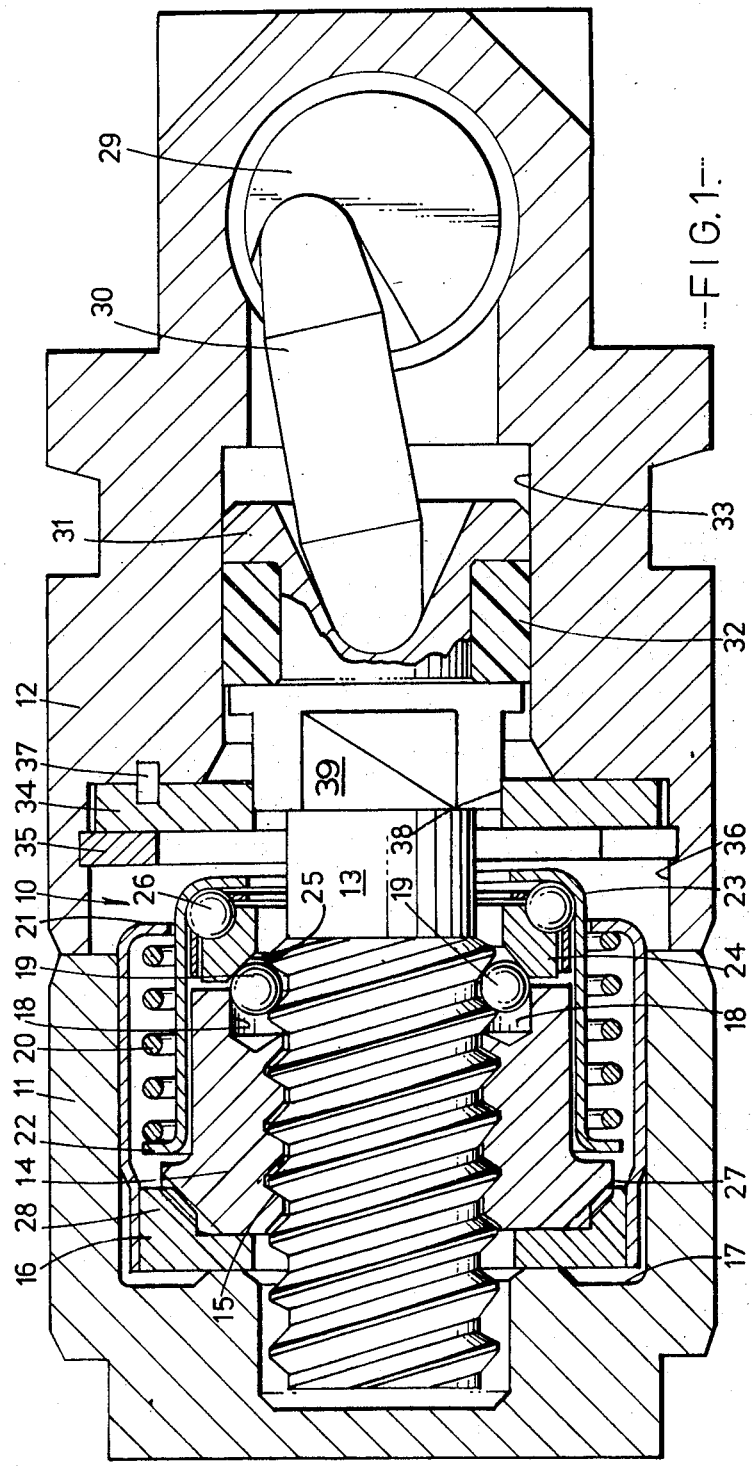
FIG. 1 is a cross-section of one embodiment of automatic adjuster in accordance with the present invention fitted between opposed pistons of a hydraulic actuator for a disc brake.

Referring to FIG. 1, an automatic adjuster 10 is operative between opposed pistons 11 and 12 of a hydraulic actuator for a disc brake of the kind shown for example in British Patent Specifications Nos. 1075371 and 1147639. The pistons 11 and 12 are slidable in a through bore in a fixed body member. A yoke is slidable in longitudinal grooves extending along opposite sides of the body member. The piston 11 acts on a directly operated brake pad whilst the piston 12 acts on the yoke which in turn acts on an indirectly operated brake pad opposed to the directly operated pad, the disc being located between the brake pads.

The adjuster 10 comprises a spindle 13 and a nut 14 having a non-reversible screw-thread connection 15 with the spindle 13. A two part casing 16 is press fitted inside a blind bore 17 in the piston 11 and the nut 14 is received within this insert. Two recesses 18 are formed in the nut 14 and serve to circumferentially locate balls 19 with respect to the nut 14. The balls 19 can roll along the screw-thread 15 on the spindle 13. A spring 20 acts between the inturned flange 21 on the two part casing 16 and an out-turned flange 22 on a race member 23 of a thrust bearing. A second race member 24 of this thrust bearing serves as a thrust washer and has an inclined surface 25 which cooperates with the balls 19. Balls 26 are disposed between the race members 23 and 24. The spring 20 thereby applies a leftward force to the balls 19 through the thrust bearing. The nut 14 is normally in abutment with the base of the two part casing 16 so that a serrated conical surface 27 on the nut 14 meshes with a complementary serrated conical surface 28 in the casing 16.

An auxiliary mechanical actuator (handbrake) comprises a cam 29 journalled in the piston 12 and acting through a dolly 30 on the righthand end of the spindle 13. The spindle 13 includes an enlarged portion 31 which is sealed by a sealing ring 32 to an internal bore 33 in the piston 12. A disc 34 is held in position by a spring ring 35 in an enlarged portion 36 of the bore in the piston 12. A dowel 37 between the disc 34 and the piston 12 prevents the disc 34 from rotating, the piston 12 being non-rotatable. The disc 34 has a non-circular opening 38 which cooperates with flats 39 on the enlarged portion 31 of the spindle 13 to prevent the spindle 13 from rotating.

During operation of the brake hydraulically the pistons 11 and 12 move apart. The fluid pressure also acts on the spindle 13 to urge it to the right together with the piston 12. The spring 20 acts on the balls 19 to tend to cause the balls 19 to roll along the screw-thread 15 on the spindle 13, the race member 24 being freely rotatable so as not to hinder such rolling. However due to the balls 19 being located in the recesses 18 rolling of the balls would cause the nut 14 to turn on the spindle 13. Such rotation of the nut 14 is normally prevented by the serrations 27 and 28 which are made sufficiently large not to come out of mesh during the normal travel between the pistons 11 and 12.

As the spindle 13 moves to the right with the piston 12 relatively to the piston 11 it carries with it the nut 14. However if there is excessive brake travel due to brake pad wear then the nut 14 is moved so far to the right that the serrations 27 and 28 are disengaged. This allows the thrust of the spring 20 acting on the balls 19 to turn the nut 14 on the spindle 13 in a direction to take up this excess travel. The turning of the nut 14 on the spindle 13 axially displaces the nut to bring the serrations 27 and 28 into interengagement once again thereby preventing further turning of the nut 14 until adjustment is again required.

Upon operation of the handbrake a thrust is applied between the pistons 11 and 12 by turning the cam 29 in an anticlockwise direction. The thrust thereby produced is applied to the spindle 13 which acts through the screw-thread connection 15 (which is non-reversible) and through the nut 14 and the casing 16 to the piston 11. It should also be mentioned that a stop (not shown) is provided to limit clockwise turning movement of the cam 29, thereby limiting travel of the pistons 11 and 12 towards one another, the extent of such travel being determined by the automatic adjuster 10.

Figure 2:
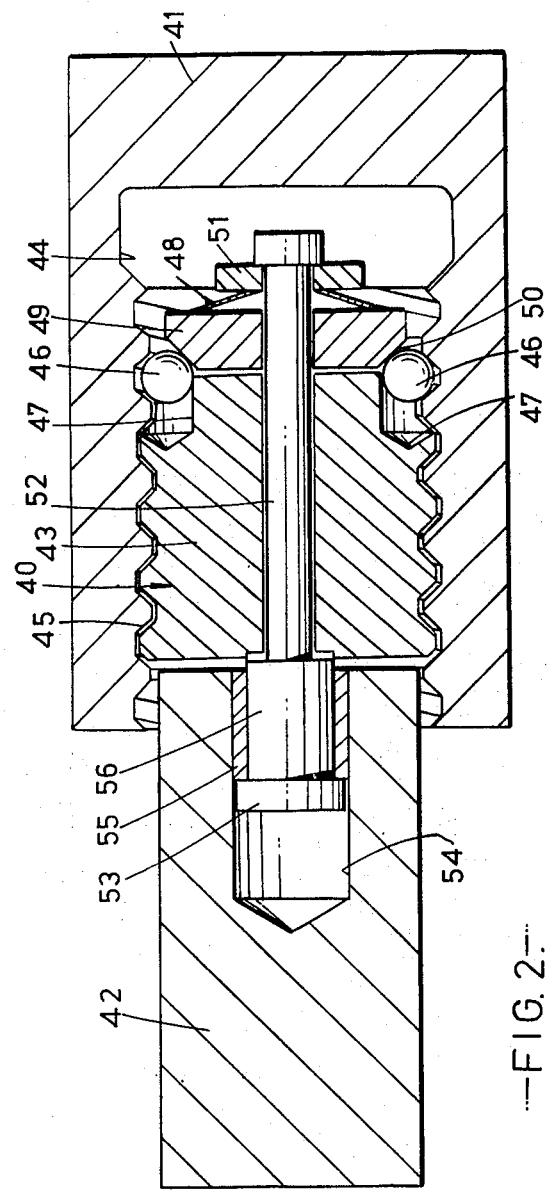
FIGS. 2 and 3 are cross-sections of second and third embodiments of automatic adjuster in accordance with the invention.

FIG. 2 of the drawings shows another embodiment of automatic adjuster 40 which comprises a first member 41, a second member 42 and a screw member 43. The screw member 43 is housed within a blind bore 44 in the member 41 and has a non-reversible screw-thread connection 45 with the member 41. Balls 46 are received in recesses 47 in the screw member 43 and are thereby circumferentially located with respect to the screw member. The balls 46 can roll along the internal thread in the member 41. A Belleville washer 48 acting against a freely rotatable race member 49 urges a conical surface 50 against the balls 46 to apply an axial force to these balls in the leftward direction tending to cause these balls to roll along the screw-thread in the member 41. The Belleville washer 48 acts against a washer 51 on the righthand end of spindle 52 the lefthand end of which has a head 53 located in a bore 54 in the member 42. The spindle 52 is held captive on the member 42 by means of an insert 55 force-fitted in the blind bore 54 and cooperating with a non-circular portion 56 of the spindle 52 permitting axial displacement but no rotation of the spindle 52.

The tendency of the Belleville washer 48 is to cause the screw member 43 to be screwed to the left until its lefthand end engages the non-circular portion 56 on the spindle 52. When this happens an axial clearance still remains between the member 42 and the screw member 43 so that the member 42 can move to the right with respect to the member 41. In other words when the automatic adjuster 40 is fitted to a vehicle brake the lost motion connection between the member 42 and the spindle 52 provides the normal running clearance of the brake and it is only when wear has taken place and there is excess brake travel that the member 42 is moved sufficiently to the left with respect to the member 41 and the screw member 43 screwed therein for the non-circular portion of the spindle 52 to be separated from the nut 43 enabling the spring 48 to turn the screw member 42 through the action of the balls 46.

Figure 3:
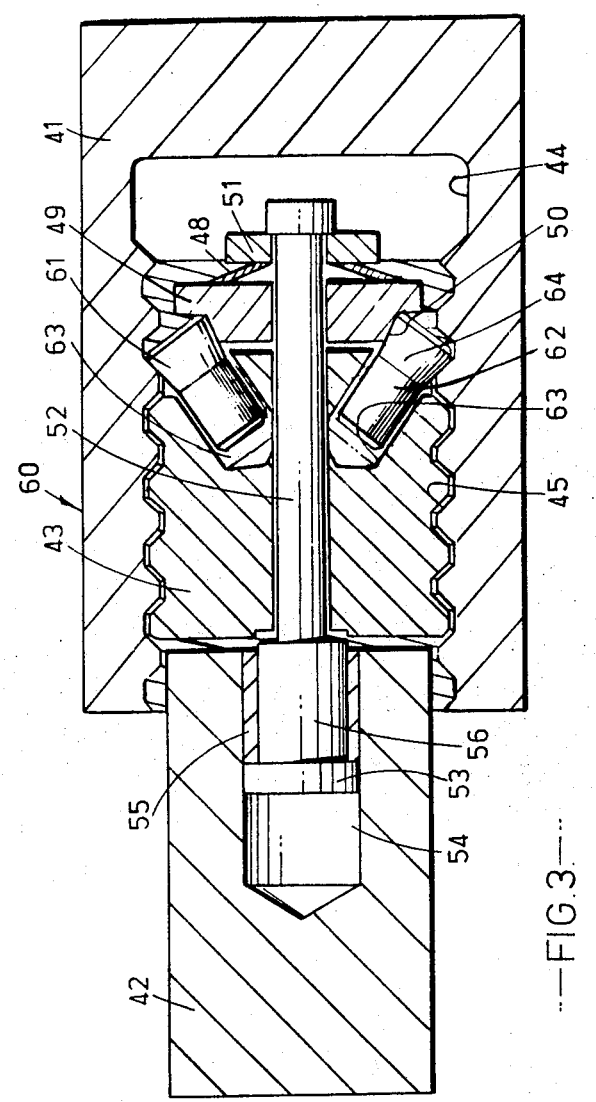

FIG. 3 shows an automatic adjuster 60 which is very similar to the adjuster 40 of FIG. 2 and parts like those of FIG. 2 are denoted by like reference numerals. The embodiment of FIG. 3 differs from that of FIG. 2 in that the balls 46 are replaced by rollers 61. Each of the rollers 61 has a cylindrical portion 62 journalled in a cylindrical recess 63 in the screw member 43 and a conical portion 64 which cooperates with the conical surface 50 on the race member 49 and with one flank of the internal screw thread in the member 41.

The operation of the embodiment of FIG. 3 is identical to that of FIG. 2.

The embodiment of FIGS. 2 and 3 could be modified in that the member 43 could be provided with internal thread meshing with an external thread on the member 41. In this case the Belleville washer 48 would be of much larger diameter and preferably acts through a thrust bearing so as not to impede rotation of the race member 49. Such an arrangement would be similar to that shown in FIG. 1.

The rolling elements such as the balls 46 or rollers 61 need not cooperate with the same screw-thread as the member having the recesses locating the rolling members. Thus of the first and second members having the non-reversible screw-thread connection therebetween one member can have a recess housing a rolling element cooperating with a separate screw-thread on the other member.

To achieve symmetrical axial loading during adjustment at least two and possibly three or more rolling elements are provided and, as the non-reversible screw-thread connection has to have the same number of starts as the number of rolling elements, the non-reversible screw-thread connection has to have a comparatively large pitch angle. To ensure that the screw-thread connection is non-reversible it follows that the screw-thread connection also has to have a comparatively large flank angle. The above disadvantages are avoided in the embodiment of FIG. 4 as will become apparent hereinafter.

Figure 4:
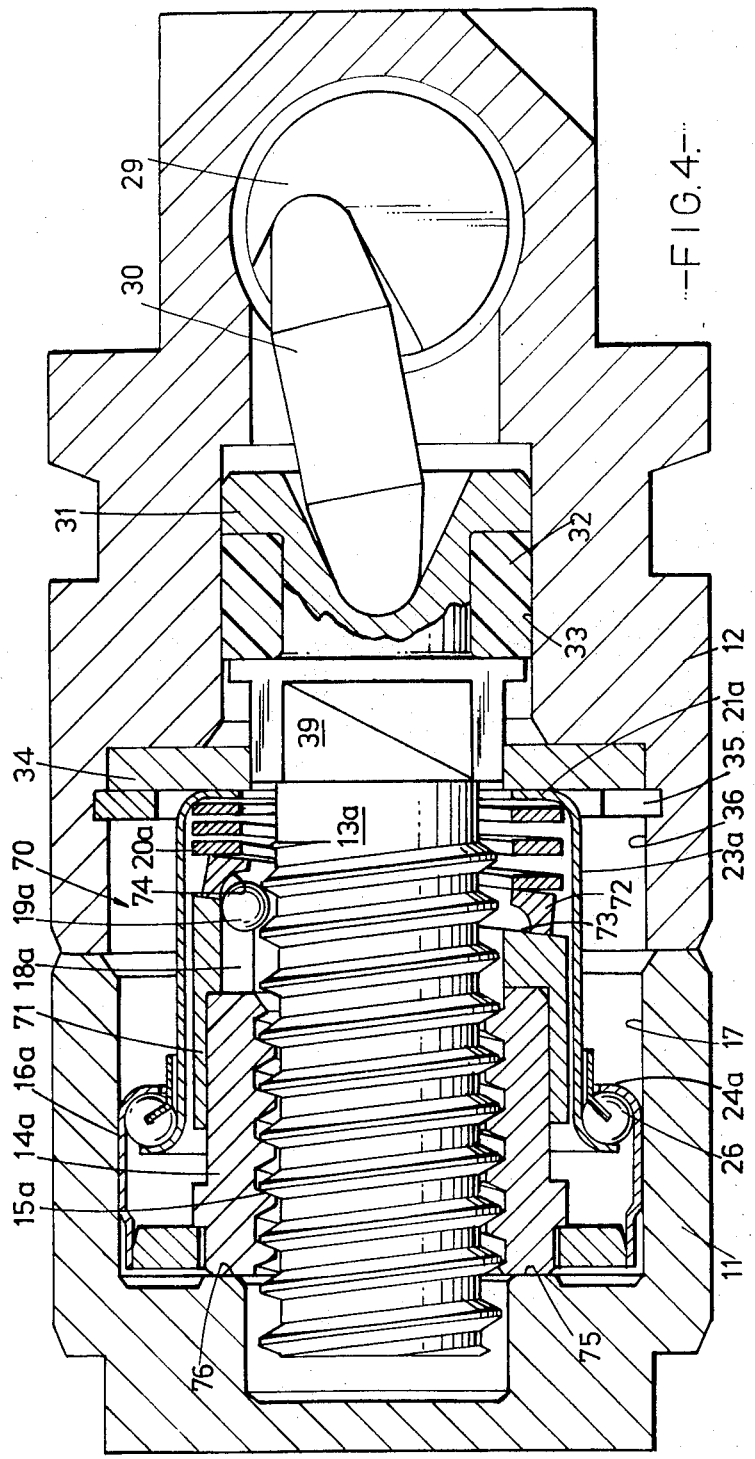
FIG. 4 is a cross-section similar to FIG. 1 showing a fourth embodiment.

In many respects, the embodiment of the adjuster 70 of FIG. 4 is similar to that of FIG. 1 and like parts are denoted by like reference numerals. However, the non-reversible screw-thread connection 15a between the spindle 13a and the nut 14a is a screw thread having a standard pitch and standard flank and helix angles, and which, although shown in FIG. 4 as being a single start thread, may alternatively by a multistart thread. A flat spring 20a acts between a thrust washer 72 and an inturned flange 21a of a race member 23a of a thrust bearing. Balls 26 of the thrust bearing are disposed between an out-turned flange of the race member 23a and an inturned flange 24a on the two-part casing 16a which is press-fitted in the blind hole 17. There are three balls 19a, of which only a single ball is shown in FIG. 4, rolling along the screw-thread 15a. The balls 19a are circumferentially located with respect to the nut 14a by being received in respective recesses 18a, only one of which is illustrated, formed in the sleeve 71 which is press-fitted over the nut 14a and thereby effectively forms a part thereof. The thrust washer 72 lies against an inclined face 73 on the end of the sleeve 71 and contains a raceway 74 for cooperation with the balls 19 a. The preferred circumferential spacing between the balls is 120°. However, other spacings are possible.

It should be noted that whilst the preferred number of rolling elements for a single start thread is three, an adjuster utilising only two rolling elements with a single start thread would function satisfactorily.

If a multi-start thread is used, the minimum number of rolling elements is still two but these could be arranged in separate threads associated with different starts. Thus, in the case of multi-start threads, at least one but not more than three rolling elements are associated with each spindle thread corresponding to each thread start.

In the resting position of the actuator there is slight axial clearance between the balls 19a and the raceway 74. The magnitude of this axial clearance is predetermined by the angular position of the sleeve 71 relative to the nut 14a. This feature enables this clearance to be accurately set without having to keep to close tolerances at the screw-thread connection 15a. It will be seen that the clearance at the screw-thread connection 15a is larger than that between the balls 19a and the raceway 74.

The axial clearance between the balls 19a and the raceway 74 permits the normal relative axial movement between the spindle 13a and the piston 11 when no adjustment is required. When excessive travel does take place, e.g. due to pad wear, the balls 19a are pressed against the raceway 74 against the force of the spring 20a and this causes the balls 19a to roll along the screw-thread 15a on the spindle 13a so turning the nut 14a due to the balls 19a being located in the recess 18a.

I claim:

1. An automatically adjustable force transmitting mechanism comprising two relatively rotatable members, a non-reversible screw-thread connection between said members, a plurality of rolling elements, means circumferentially locating said rolling elements with respect to one of said members, screw-thread means in the other of said members, said rolling elements being disposed in rolling relation with the last-mentioned screw-thread means, and means for applying an axially directed force to said rolling elements responsively to a requirement for adjustment to thereby cause said rolling elements to roll along said screw-thread means in said other member and thereby cause said one member to rotate relative to said other member.

2. A mechanism according to claim 1, in which said means for applying an axially directed force includes a thrust element disposed to engage said rolling elements and a spring acting on said thrust element.

3. A mechanism according to claim 2, in which said spring acts between said one member and said thrust element.

4. A mechanism according to claim 3, further comprising a rolling bearing between said spring and one of said member and thrust element.

5. A mechanism according to claim 1, in which said one member relative to which said rolling elements are circumferentially located comprises a nut and said other member comprises a spindle and in which said screw-thread connection and said screwthread means comprise an internal thread on said nut and an external thread on said spindle, said rolling members rolling in said external thread.

6. A mechanism according to claim 5, which further comprises a casing surrounding said nut and providing abutment means for said spring, said nut being urged by said spring against one end of said casing.

7. A mechanism according to claim 6 in which said nut and said casing have cooperating serrations, said spring biasing said serrations into interengagement.

8. A mechanism according to claim 6, in which said rolling bearing includes an intermediate race member, said spring surrounding said race member and acting between said race member and said casing and in which said rolling bearing is provided between said race member and said thrust element.

9. A mechanism according to claim 1, in which said one member relative to which said rolling elements are circumferentially located comprises a screw-member and said screw-thread connection comprises an external thread on said screw-member and an internal thread in said other member, said rolling elements rolling in said internal thread.

10. A mechanism according to claim 1 in which said rolling elements comprise balls.

11. A mechanism according to claim 1, in which said rolling elements comprise conical rollers journalled in said one member.

12. An automatically adjustable force transmitting mechanism comprising two relatively rotatable members, a non-reversible multi-start screw-thread connection between said members, a plurality of rolling elements equal in number to the number of starts of said multi-start screw-thread connection, said rolling elements being circumferentially located with respect to one of said members and rolling in respective starts of multi-start screw-thread means in the other of said members, and means for applying an axially directed force to said rolling elements responsively to a requirement for adjustment to thereby cause said rolling elements to roll along said screw-thread on said other member and thereby cause said one member to rotate on said other member.

13. An automatically adjustable force transmitting mechanism comprising a nut and a spindle rotatable relatively to one another, a non-reversible screw-thread connection between said nut and spindle, said non-reversible screw-thread connection comprising a single start internal thread in said nut and a single start external thread on said spindle, balls, said nut having respective recesses receiving said balls to circumferentially locate said balls relative to said nut and rolling in said external thread in said spindle, and a thrust element disposed to engage said balls, and a spring acting on said thrust element for applying an axially directed force to said balls responsively to a requirement for adustment to thereby cause said balls to roll along said external screw-thread on said spindle and thereby cause said nut to rotate on said spindle, said thrust element being tilted relative to said nut.

14. An automatically adjustable force transmitting mechanism comprising a nut and a spindle rotatable relatively to one another, a non-reversible screw-thread connection between said nut and spindle, said non reversible screw-thread connection comprising a multi-start internal thread in said nut and a multi-start external thread on said spindle, balls, at least one but not more than three such balls rolling in each of the spindle threads corresponding to each thread start, said nut having respective recesses receiving said balls to circumferentially locate said balls relative to said nut, and a thrust element disposed to engage said balls and a spring acting on said thrust element, for applying an axially directed force to said balls responsively to a requirement for adjustment to thereby cause said balls to roll along said spindle thread and thereby cause said nut to rotate on said spindle, said thrust element being tilted relative to said nut.

15. A mechanism according to claim 13, in which said nut has an inclined face and said thrust element comprises a thrust washer resting against said inclined face.

16. A mechanism according to claim 13, in which said nut comprises two parts, of which one part has said internal screw-thread therein and the other part has said recess therein receiving said balls, which two parts can be fitted together in any desired relative angular position.

17. A mechanism according to claim 13 which further comprises a casing which can be axially abutted by said nut, a race member and a rolling bearing between said race member and said casing said spring acting between said thrust element and said race member.

18. A mechanism according to claim 1 which is fitted to a hydraulic brake actuator comprising opposed pistons, an auxiliary mechanical actuator being fitted in one of said pistons, said mechanism being operative between said mechanical actuator and the other of said pistons.

* * * * *